(12) United States Patent
Cho et al.

(10) Patent No.: US 10,731,600 B2
(45) Date of Patent: Aug. 4, 2020

(54) PISTON WITH SOOT REDUCING PISTON BOWL

(71) Applicant: Deere & Company, Moline, IL (US)

(72) Inventors: Nam Hyo Cho, Cedar Falls, IA (US);
Changdeo D. Gaikwad, Pune (IN);
Nagesh Choudhary, Pune (IN);
Amandeep Sharma, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/805,778

(22) Filed: Nov. 7, 2017

(65) Prior Publication Data

US 2019/0136794 A1 May 9, 2019

(51) Int. Cl.
*F02F 3/28* (2006.01)
*F02B 23/06* (2006.01)

(52) U.S. Cl.
CPC .............. *F02F 3/28* (2013.01); *F02B 23/06* (2013.01); *F02B 23/0693* (2013.01)

(58) Field of Classification Search
CPC ......... F02F 3/28; F02B 23/06; F02B 23/0693; F02B 23/0696
See application file for complete search history.

(56) References Cited

U.S. PATENT DOCUMENTS

| | | | | |
|---|---|---|---|---|
| 3,954,089 A | * | 5/1976 | Hardesty | ............. F02B 23/0624 123/276 |
| 4,941,440 A | * | 7/1990 | Weber | ................. F02B 23/0696 123/193.6 |
| 6,328,001 B1 | * | 12/2001 | Kirtley | ................ F02B 23/0696 123/193.3 |
| 7,431,012 B1 | | 10/2008 | Glenn et al. | |
| 8,156,927 B2 | | 4/2012 | Iikubo et al. | |
| 8,276,563 B2 | | 10/2012 | Quigley et al. | |
| 8,327,822 B2 | | 12/2012 | Asai et al. | |
| 8,677,970 B2 | | 3/2014 | Venugopal et al. | |

(Continued)

FOREIGN PATENT DOCUMENTS

| | | |
|---|---|---|
| JP | 2004190572 A | 7/2004 |
| JP | 5575530 A | 11/2011 |

(Continued)

*Primary Examiner* — Lindsay M Low
*Assistant Examiner* — Ruben Picon-Feliciano
(74) *Attorney, Agent, or Firm* — Klintworth & Rozenblat IP LLP

(57) ABSTRACT

A piston includes a piston body having an outer cylindrical surface and defined along a longitudinal piston center axis. The piston further includes a piston bowl with a half section profile with a bowl entry extending radially from the longitudinal piston center axis; a bowl recess extending radially from the bowl entry; and a soot shelf extending from the bowl recess to define a soot shelf axial height (H) and a soot shelf radial width (W). The soot shelf includes an inner step being formed by an inner step base surface extending radially from the bowl recess; an outer step being formed by a step shoulder surface extending axially from the inner step base surface and an outer step base surface extending radially from the step shoulder surface; and a soot shelf shoulder surface extending axially from outer step base surface to the end perimeter surface.

14 Claims, 7 Drawing Sheets

(56) References Cited

U.S. PATENT DOCUMENTS

| | | | |
|---|---|---|---|
| 2011/0011365 A1* | 1/2011 | Levy | F02B 23/0672 123/193.6 |
| 2012/0234268 A1* | 9/2012 | Genter | F02F 3/26 123/41.72 |
| 2013/0036998 A1 | 2/2013 | Cornwell et al. | |
| 2016/0138520 A1* | 5/2016 | Subatch, Jr. | F02F 3/28 123/193.6 |

FOREIGN PATENT DOCUMENTS

| | | |
|---|---|---|
| WO | 2009077493 A1 | 6/2009 |
| WO | 2012125961 A1 | 9/2012 |
| WO | 2014196423 A1 | 12/2014 |

* cited by examiner

PISTON WITH SOOT REDUCING PISTON BOWL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to internal combustion engines, and more specifically, to pistons for such engines.

BACKGROUND OF THE DISCLOSURE

A direct injection diesel engine is an internal combustion engine in which injected fuel is ignited as a result of temperature and pressure conditions within a combustion chamber. The characteristics of the pistons forming the combustion chamber in the engine are particularly important with respect to efficiency and engine-out emissions. For example, engines are subject to increasingly stringent emissions standards for particulate matter, a source of which may be soot formation in the combustion chamber. Accordingly, there is a need for pistons that minimize soot formation.

SUMMARY OF THE DISCLOSURE

The disclosure provides internal combustion engines with pistons having piston bowls configured to reduce soot formation.

In one aspect, a piston is provided for reciprocating within a cylinder bore having a cylinder bore radius (R) in an internal combustion engine. The piston includes a piston body having an outer cylindrical surface and defined along a longitudinal piston center axis. The piston body has a first axial piston end and a second axial piston end. The piston further includes a piston bowl defined in the first axial piston end and surrounded by an end perimeter surface on the first axial piston end. The piston bowl has a half section profile with a bowl entry extending radially from the longitudinal piston center axis; a bowl recess extending radially from the bowl entry and defining a bowl depth (D); and a soot shelf extending from the bowl recess to the end perimeter surface to define a soot shelf axial height (H) and a soot shelf radial width (W). The soot shelf includes an inner step being formed by an inner step base surface extending radially from the bowl recess; an outer step being formed by a step shoulder surface extending axially from the inner step base surface and an outer step base surface extending radially from the step shoulder surface; and a soot shelf shoulder surface extending axially from outer step base surface to the end perimeter surface. The soot shelf shoulder surface and the end perimeter surface form an annular bowl edge. The piston bowl has a bowl radius (R1) defined between the longitudinal piston center axis and the annular bowl edge that is approximately 70% of the cylinder bore radius (R). The step shoulder surface of the outer step defines an outer step axial height (H1) that is approximately 40% of the soot shelf axial height (H). The bowl depth (D) is approximately 50% of the bowl radius (R1).

In another aspect, a piston is provided for reciprocating within a cylinder bore having a cylinder bore radius (R) in an internal combustion engine. The piston includes a piston body with an outer cylindrical surface and defined along a longitudinal piston center axis. The piston body has a first axial piston end and a second axial piston end. The piston further includes a piston bowl defined in the first axial piston end and surrounded by an end perimeter surface on the first axial piston end. The piston bowl has a half section profile with a bowl entry extending radially from the longitudinal piston center axis and defining a bowl floor half angle of approximately 72°. The profile further includes a bowl recess extending radially from the bowl entry and defining a bowl depth (D). The bowl recess is formed with a curved surface extending from the bowl entry and transitioning into a bowl recess side wall, the bowl recess side wall being generally parallel to the longitudinal piston center axis. The profile further includes a soot shelf extending from the bowl recess side wall to the end perimeter surface at an annular bowl edge to define a soot shelf axial height (H) and a soot shelf radial width (W). The soot shelf includes a base surface extending radially from the bowl recess side wall and a shoulder surface extending axially from the base surface. The piston bowl has a bowl radius (R1) defined between the longitudinal piston center axis and the annular bowl edge that is approximately 70% of the cylinder bore radius (R). The bowl entry and the bowl recess collectively define an inner bowl radius (R2) between the longitudinal piston center axis and the soot shelf, the inner bowl radius (R2) being approximately 50% of the cylinder bore radius (R). The bowl depth (D) is approximately 50% of the bowl radius (R1).

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed pistons and internal combustion engines with pistons, as shown in the accompanying figures of the drawings described briefly above. Various examples herein refer to the context of an engine for a work machine. It will be understood, however, that the disclosed examples may be utilized in a variety of settings. Various modifications to the example embodiments may be contemplated by one of skill in the art.

Figure 1:
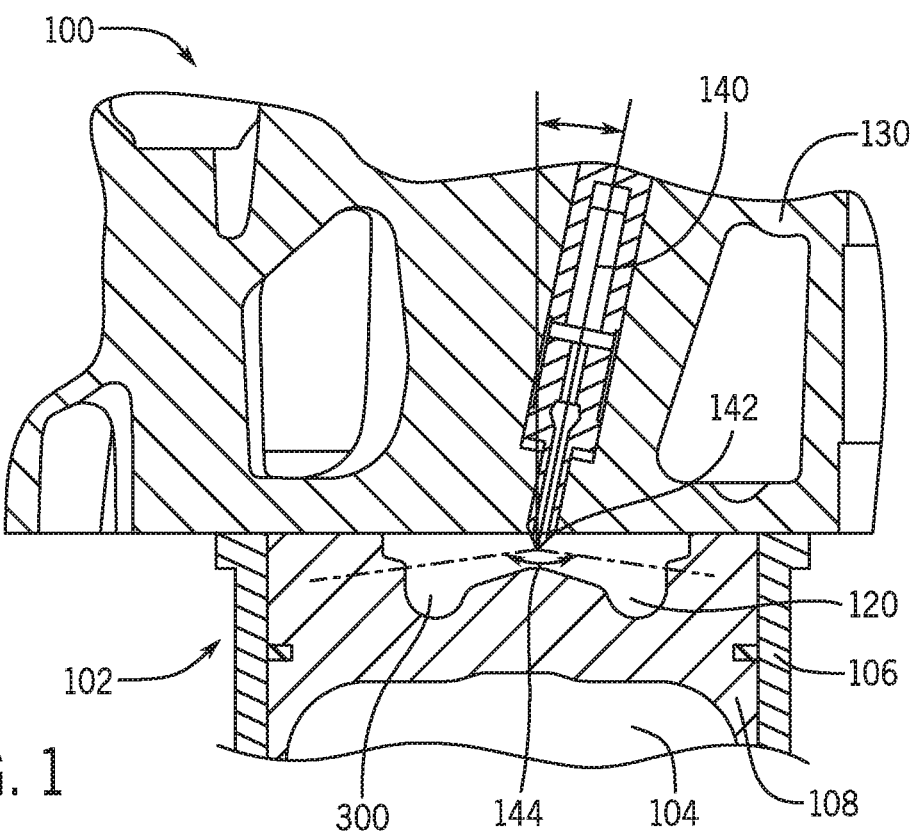
FIG. 1 is a first partial cross sectional view of an engine having a piston according to an example embodiment.
Figure 2:
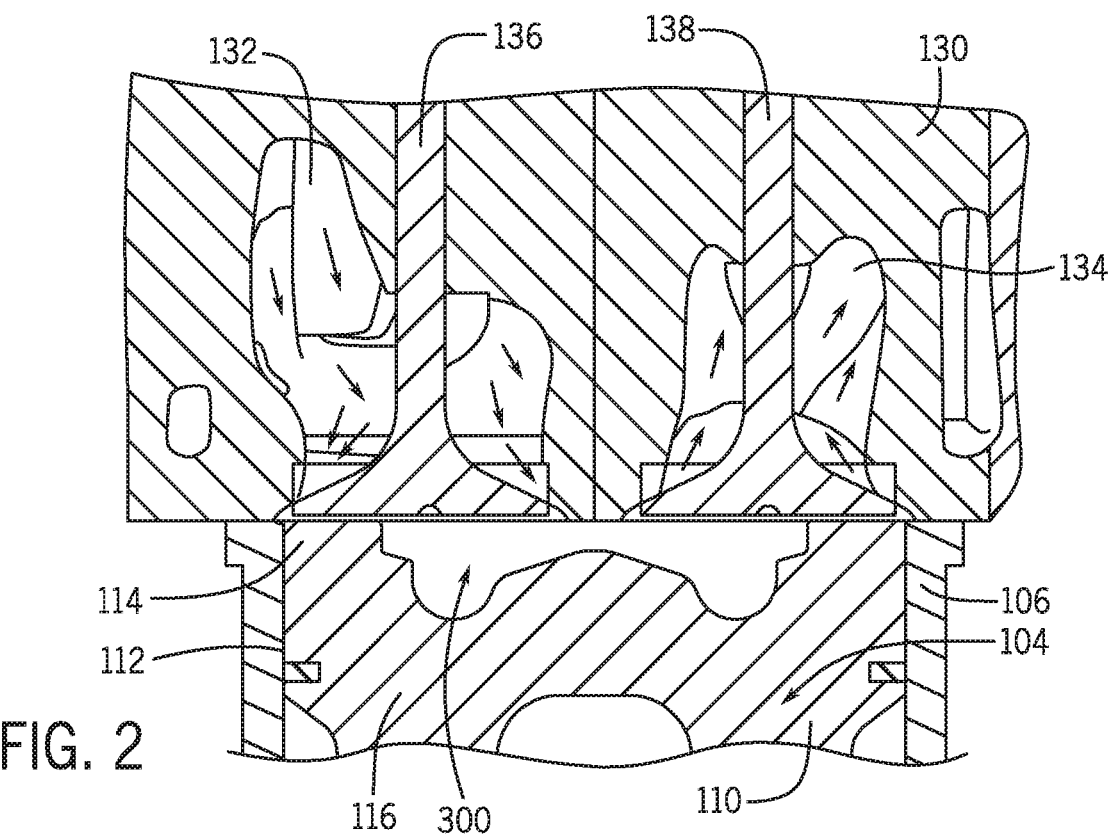
FIG. 2 is a second partial cross sectional view of an engine of FIG. 1 according to an example embodiment.

FIGS. 1 and 2 are partial cross-sectional views of an internal combustion engine 100. Generally, FIG. 2 may be considered a view of the engine 100 of FIG. 1 rotated about a piston longitudinal center axis 101. In one example, engine 100 operates on the principal of reciprocating pistons moved in response to a combustion event in a combustion chamber, as described below. The reciprocating motion of the pistons is converted into rotary motion through the means of a crankshaft (not shown). However, it should be apparent to those skilled in the art that the reciprocating motion of the pistons may be utilized in various types of engines, particularly power engines for moving vehicles.

As described in greater detail below, the engine 100 is configured to result in improved engine-out emissions, particularly a reduction in soot during the combustion process. Soot generally includes a combination of smoke and particulate matter, e.g., from impure carbon resulting from incomplete combustion. As such, soot may be reduced by more evenly mixing the fuel and air in the combustion chamber.

As shown, engine 100 includes a block 102 having a number of cylinder bores 104 defined by cylinder liners 106 for receiving reciprocating pistons 108, only one of which is shown. A cylinder head 130 bounds one end of the cylinder bore 104 and houses the components for delivering fuel and air to the cylinder bore 104, as described in greater detail below.

Although not shown in detail, the piston 108 includes a cylindrical piston body 110 having a pivotal connection via a wrist pin and a connecting rod to a crankshaft to provide a rotary power output in response to reciprocation of piston 108. It should be noted that a plurality of pistons 108 may be provided depending upon the requirements and duty cycle of the engine 100.

The piston body 110 has an outer cylindrical surface or side wall 112 and first and second axial ends 114, 116. A piston (or combustion) bowl 300 is defined in the body 110 of the piston 108 at the first axial end 114. The piston bowl 300 is discussed in greater detail below.

The piston 108 is arranged within cylinder bore 104 to define a combustion chamber 120 bounded by the cylinder liner 106, the cylinder head 130, and the piston bowl 300. The head 130 has intake passages or ports 132 and exhaust passages or ports 134. An intake valve 136 is positioned to open and close the intake passage 132 to selectively allow the entry of air into the combustion chamber 120, and an exhaust valve 138 is positioned to open and close the exhaust passage 134 to selectively allow the exit of the combustion products from the combustion chamber 120. A fuel injector 140 is arranged within the cylinder head 130 with an injector tip 142 positioned to deliver fuel into the combustion chamber 120 at a fuel spray angle 144. The fuel injector 140 may be angled relative to the longitudinal center axis 101, as shown, or coaxial with the longitudinal center axis 101.

The fuel may be injected coaxially with the axis of the injector 140 in a radiated pattern so as to permeate the combustion chamber 120. The number of discrete holes provided in injector 140, the cross sectional flow areas, and the angle of spray may vary.

Although not shown, the intake air is pressurized by a compressor of a turbocharger and cooled by means of an after cooler, and the exhaust gasses pass through a turbocharger turbine and then to exhaust after treatment devices. In some applications, exhaust gas recirculation may be provided to reduce the combustion temperatures and reduce the oxides of nitrogen.

In one example, the engine 100 operates on a compression ignition cycle in which air that has entered combustion chamber 120 through the intake passage 132 and intake valve 136 is pressurized to such an extent that fuel injected from the fuel injector 140 at the appropriate time and in the appropriate quantity is ignited by the heat of compression. In one embodiment, the engine 100 operates according to a four stroke combustion cycle, although in other embodiments, the engine 100 may operate according to a two stroke or another combustion cycle.

Accordingly, in one example, the four stroke combustion and expansion cycle includes an air suction or intake stroke, an air compression stroke, an explosion stroke right after fuel injection, and an exhaust stroke. During the intake stroke, which initiates at top dead center (TDC) and ends at bottom dead center (BDC), the intake valve 136 is open such that the piston 108 pulls air into the cylinder bore 104 through its downward motion. Through the intake stroke, intake gas undergoes a toroidal or swirling flow motion in the cylinder bore 104. The strength of swirling flow or angular momentum may be measured on a swirl flow bench as a swirl ratio, which is non-dimensional and usually independent of engine speed.

During the subsequent compression stroke, the intake valve 136 closes and piston 108 rises to compress the air in the cylinder bore 104. During the combustion stroke, which is near TDC, fuel is injected into the combustion chamber 120, particularly the piston bowl 300, and is ignited by the elevated temperature and pressure. FIGS. 1 and 2 depict the piston 108 near TDC, e.g., during the beginning of the combustion stroke as fuel is being introduced into the combustion chamber 120. As described in greater detail below, the piston bowl 300 includes characteristics to enhance the mixing of the air and fuel.

Upon combustion, the energy release of the fuel and air mixture drives the piston 108 downward in the cylinder bore 104 to produce kinetic energy. During the exhaust stroke, the exhaust valve 138 is opened as the piston 108 rises to force the exhaust products out of the cylinder bore 104.

Although not shown, operation of the engine 100 (e.g., the fuel injectors 140, pistons 108, valves 136, 138, etc.) may be controlled by a control system with a controller, which may be configured as a computing device with associated processor devices and memory architectures, as a hard-wired computing circuit (or circuits), as a programmable circuit, or otherwise. As such, the controller may be configured to execute various computational and control functionality with respect to the work machine and/or associated system.

Figure 3:
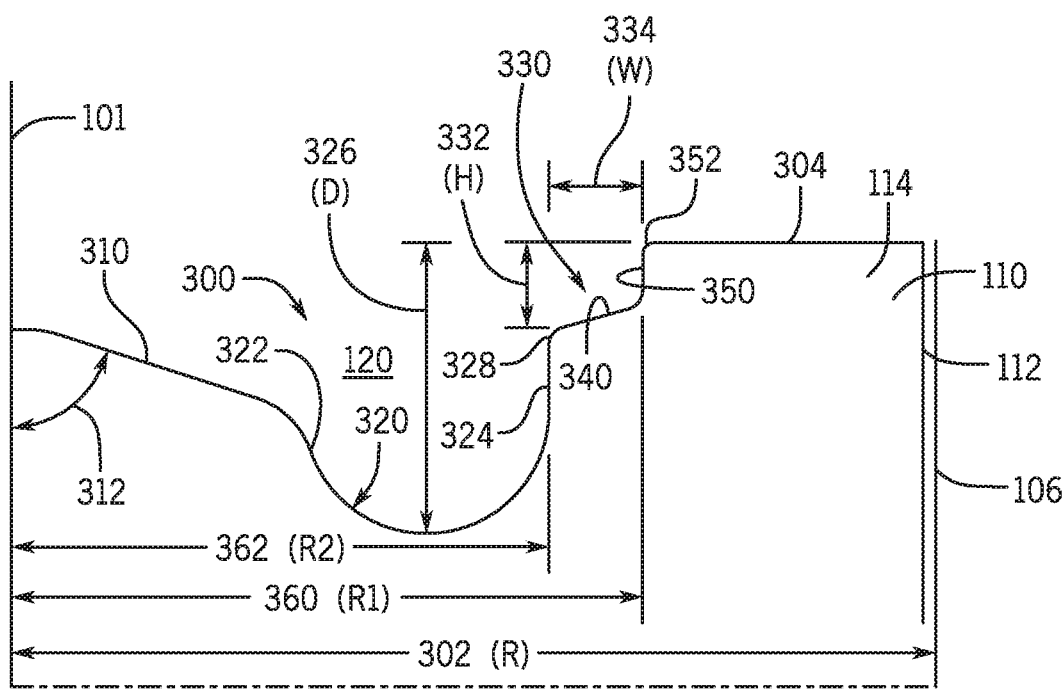
FIG. 3 is a more detailed partial view of a piston bowl of the piston of FIGS. 1 and 2 according to an example embodiment.

FIG. 3 is a half profile cross-sectional view of the piston bowl 300 in accordance with an exemplary embodiment. For clarity in this discussion, the piston bowl center axis is aligned with the engine cylinder axis, although other embodiments may vary. As noted above, the piston bowl 300 is annular such that the overall structure corresponds to the view of FIG. 3 rotated about the piston longitudinal center axis 101. The terms "radial" and "axial" are used herein to reference orientations relative to the longitudinal center axis 101 in a cylindrical coordinate system. In particular, the term "radial" refers to a direction or orientation perpendicular to the longitudinal center axis 101, and the term "axial" refers to a direction or orientation parallel to the longitudinal center axis 101.

Generally, the piston bowl 300 is formed in the first axial piston end 114 of the piston body 110 reciprocating within the cylinder bore 104 having a cylinder bore radius 302 (R). As such, the piston bowl 300 is surrounded by an end perimeter surface 304 that extends between the piston bowl 300 and the outer cylindrical surface 112 of the piston body 110.

In this example, the piston bowl 300 includes a bowl entry 310 that extends radially outward from the longitudinal center axis 101 and axially inward into the piston body 110. In one embodiment, the bowl entry 310 is generally planar and extends at an angle 312 relative to the longitudinal center axis 101 of approximately 72°. In this context, "approximately 72°" includes an angle of 72°±5°, although other angle values may be provided. As described in greater detail below, these characteristics may contribute to the reduction of soot formation.

As also shown in FIG. 3, the piston bowl 300 includes a bowl recess 320 that extends radially outward from the bowl entry 310. In this embodiment, the bowl recess 320 includes a curved surface 322 that extends axially inward into the piston body 110 and transitions outwardly into a bowl recess side wall 324. In one embodiment, the bowl recess 320 defines a bowl depth 326 (D) that is the maximum axial depth of the piston bowl 300 relative to the end perimeter surface 304 of the piston end 114.

The bowl depth 326 (D) and bore radius 302 (R) may be sized to reduce soot formation, discussed below. As an example, the bowl depth 326 (D) may be approximately 50% of the cylinder bore radius 302 (R). In particular, the bowl depth 326 (D) is approximately 47% (e.g., 47%±10%) of the cylinder bore radius 302 (R).

In the depicted example, the bowl recess side wall 324 is generally parallel to the longitudinal center axis 101. In other words, in this example, the bowl recess 320 does not have re-entrancy. As described in greater detail below, these characteristics may contribute to the reduction of soot formation.

The piston bowl 300 further includes a soot shelf 330 extending from the bowl recess side wall 324 to the end perimeter surface 304. The soot shelf 330 may be considered to have a soot shelf axial height 332 (H) and a soot shelf radial width 334 (W). The soot shelf 330 includes a base surface 340 extending generally in the radial direction from the bowl recess side wall 324 and a shoulder surface 350 extending generally in an axial direction from the base surface 340. In one example, the base surface 340 may be completely in the radial direction, e.g., approximately 90° relative to the longitudinal center axis 101. In other examples, the base surface 340 may be slightly angled, e.g., less than 15°, or less than 10° relative to radial line and extending slightly axially outward. As described in greater detail below, these characteristics may contribute to the reduction of soot formation.

The axial height 332 (H), the cylinder bore radius 302 (R), and the radial width 334 (W) may be sized to reduce soot formation, discussed below. As an example, the axial height 332 (H) of the soot shelf 330 is approximately 10% of the cylinder bore radius 302 (R), and the radial width 334 (W) of the soot shelf 330 is approximately 10% of the cylinder bore radius 302 (R).

The soot shelf 330 is joined with the bowl recess 320 at an annular bowl lip 328. The bowl lip 328 may be approximately 100°, although in other embodiments the bowl lip 328 may other angles, such as approximately 90°. In some examples, the bowl lip 328 may be slightly rounded, e.g. with a radius of curvature of less than approximately 1 mm (e.g., 1 mm±0.25 mm) or less than approximately 0.5 mm (e.g. 0.5 mm±0.25 mm). As described in greater detail below, these characteristics may contribute to the reduction of soot formation.

The soot shelf 330 is joined with the end perimeter surface 304 at an annular bowl edge 352. The bowl edge 352 may be approximately 90°. In some examples, the bowl edge 352 may be slightly rounded, e.g. with a radius of curvature of less than approximately 1 mm (e.g., 1 mm±0.25 mm) or less than approximately 0.5 mm (e.g. 0.5 mm±0.25 mm). In other examples, the bowl edge 352 may be chamfered, such as chamfered with a cut less than approximately 0.25 mm. As described in greater detail below, these characteristics may contribute to the reduction of soot formation.

In one embodiment, the piston bowl 300 has a bowl radius 362 (R1) in the radial direction from the longitudinal center axis 101 to the bowl edge 352. The bowl radius 360 (R1) and bore radius 302 (R) may be sized to reduce soot formation, discussed below. As an example, the bowl radius 360 (R1) may be approximately two-thirds (or 67%) of the cylinder bore radius 302 (R). In this context, "approximately 67%" may be considered 67%±10%. As another example, the bowl radius 360 (R1) may be approximately 70% (e.g., 70%±10%) of the cylinder bore radius 302 (R).

Further, the piston bowl 300 may be considered to have an inner bowl radius 362 (R2) in the radial direction from the longitudinal center axis 101 to the bowl lip 328. The inner bowl radius 362 (R2) and bore radius 302 (R) may be sized to reduce soot formation, discussed below. As an example, inner bowl radius 362 (R2) is approximately 50% (e.g., 50%±10%) of the cylinder bore radius 302 (R). In particular, the inner bowl radius 362 (R2) is approximately 47% (e.g., 47%±10%) of the cylinder bore radius 302 (R).

Figure 4:
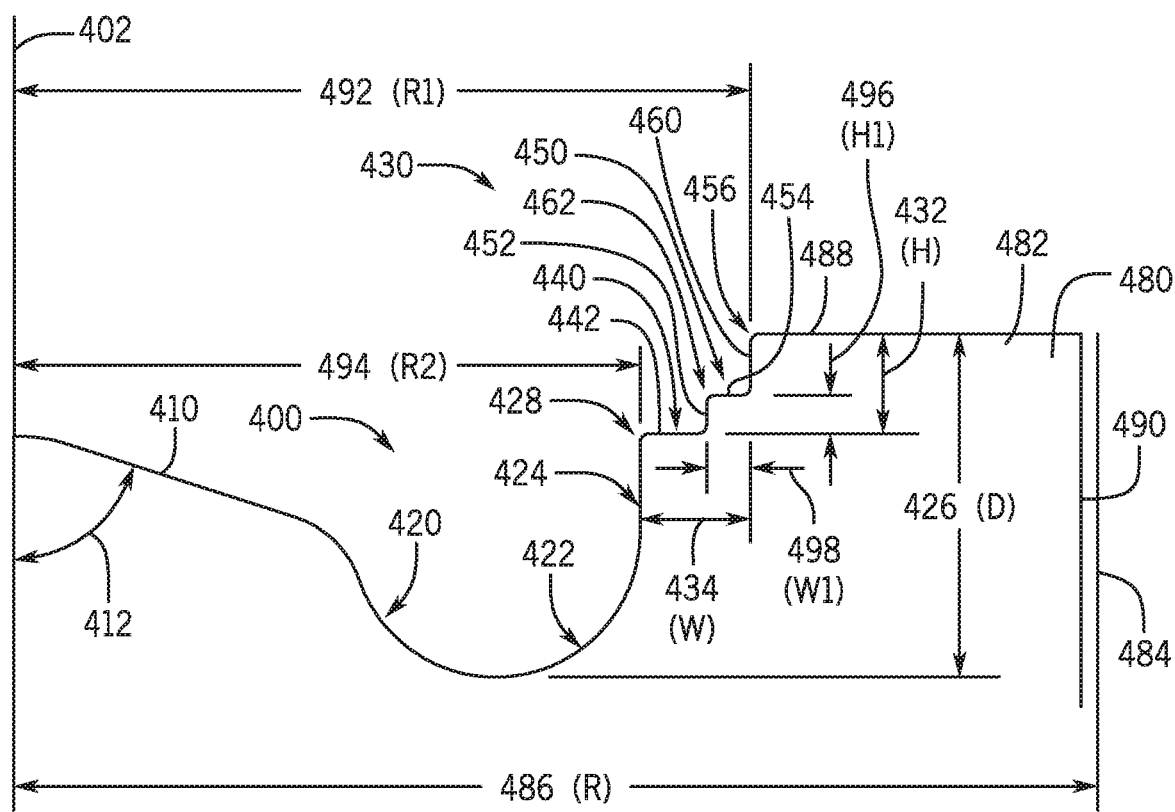
FIG. 4 is a more detailed partial view of a piston bowl according to a further example embodiment.

FIG. 4 is a half profile cross-sectional of a piston bowl 400 in accordance with another exemplary embodiment. Unless otherwise noted, the piston bowl 400 is similar to the piston bowl 300 of FIG. 3. As above, the piston bowl 400 is annular such that the overall structure corresponds to the view of FIG. 4 rotated about a longitudinal center axis 402. The piston bowl 400 is formed in a first axial piston end 482 of the piston body 480 reciprocating within a cylinder bore 484 having a cylinder bore radius 486 (R). As such, the piston bowl 400 is surrounded by an end perimeter surface 488 that extends between the piston bowl 400 and the outer cylindrical surface 490 of the piston body 480.

In this example, the piston bowl 400 includes a bowl entry 410 that extends radially outward from the longitudinal center axis 402 and axially inward into the piston body 480. In one embodiment, the bowl entry 410 is generally planar and extends at an angle 412 relative to the longitudinal center axis 402 of approximately 72°. In this context, "approximately 72°" includes an angle of 72°±5°, although other angle values may be provided. As described in greater detail below, these characteristics may contribute to the reduction of soot formation.

As also shown in FIG. 4, the piston bowl 400 includes a bowl recess 420 that extends radially outward from the bowl entry 410. In this embodiment, the bowl recess 420 includes a curved surface 422 that extends axially inward into the piston body 480 and transitions outwardly into a bowl recess side wall 424. In one embodiment, the bowl recess 420 defines a bowl depth 426 (D) that is the maximum axial depth of the piston bowl 400 relative to the end perimeter surface 488 of the piston end 482.

The bowl depth 426 (D) and bore radius 486 (R) may be sized to reduce soot formation, discussed below. As an example, the bowl depth 426 (D) may be approximately 50% (e.g., 50%±10%) of the cylinder bore radius 486 (R). In particular, the bowl depth 426 (D) is approximately 47% (e.g., 47%±10%) of the cylinder bore radius 486 (R).

In one example, the bowl recess side wall 424 is generally parallel to the longitudinal center axis 402. In other words, in this example, the bowl recess 420 does not have re-entrancy. As described in greater detail below, these characteristics may contribute to the reduction of soot formation.

The piston bowl 400 further includes a soot shelf 430 extending from the bowl recess side wall 424 to the end perimeter surface 304. The soot shelf 430 may be considered to have a soot shelf axial height 432 (H) and a soot shelf radial width 434 (W). The axial height 432 (H), the cylinder bore radius 486 (R), and the radial width 434 (W) may be sized to reduce soot formation, discussed below. As an example, the axial height 432 (H) of the soot shelf 430 is approximately 10% of the cylinder bore radius 486 (R), and the radial width 434 (W) of the soot shelf 430 is approximately 10% of the cylinder bore radius 486 (R).

In this embodiment, the soot shelf 430 is "double-stepped" with an inner step 440 and an outer step 450. The inner step 440 includes an inner step base surface 442 extending in a radial direction from the bowl recess side wall 424. In one embodiment, the inner step base surface 442 extends substantially in the radial direction, e.g., approximately 90° relative to the longitudinal center axis 402. In other embodiments, the inner step base surface 442 may be slightly angled relative to radial (e.g., less than 15°, or less than 10°). As described in greater detail below, these characteristics may contribute to the reduction of soot formation.

The outer step 450 is formed by a step shoulder surface 452 extending axially relative to the inner step base surface 442. In one embodiment, the step shoulder surface 452 is substantially parallel to the longitudinal center axis 402. The outer step 450 further includes an outer step base surface 454 extending radially from the step shoulder surface 452. In one embodiment, the outer step base surface 454 extends substantially in the radial direction, e.g., approximately 90° relative to the longitudinal center axis 402. In other embodiments, the outer step base surface 454 may be slightly angled relative to radial (e.g., less than 15°, or less than 10°). As described in greater detail below, these characteristics may contribute to the reduction of soot formation.

The soot shelf 430 further includes a soot shelf shoulder surface 460 extending in the axial direction from the outer step base surface 454 to the end perimeter surface 488. In one embodiment, the soot shelf shoulder surface 460 is parallel to the longitudinal center axis 402, although in other embodiments, the soot shelf shoulder surface 460 may be angled.

The step shoulder surface 452 of the outer step 450 defines an outer step axial height 496 (H1). The outer step axial height 496 (H1) and the bowl shelf axial height 432 (H) may be sized to reduce soot formation. For example, outer step axial height 496 (H1) may be approximately 40% of the bowl shelf axial height 432 (H). In this context, "approximately 40%" includes 40%±10%. In some embodiments, the outer step axial height 496 (H1) may be less than approximately 40% of the bowl shelf axial height 432 (H).

The inner step 440 of the soot shelf 430 is joined with the bowl recess 420 at an annular bowl lip 428. The bowl lip 428 may be approximately 90°. In some examples, the bowl lip 428 may be slightly rounded, e.g. with a radius of curvature of less than approximately 1 mm (e.g., 1 mm±0.25 mm) or less than approximately 0.5 mm (e.g. 0.5 mm±0.25 mm).

The soot shelf shoulder surface 460 is joined with the end perimeter surface 488 at an annular bowl edge 456. The bowl edge 456 may be approximately 90°. In some examples, the bowl edge 456 may be slightly rounded, e.g. with a radius of curvature of less than approximately 1 mm (e.g., 1 mm±0.25 mm) or less than approximately 0.5 mm (e.g. 0.5 mm±0.25 mm). In other examples, the bowl edge 456 may be chamfered, such as chamfered with a cut less than approximately 0.25 mm.

The inner step 440 and the outer step 450 are joined at the step edge 462. In some examples, the step edge 462 may be slightly rounded, e.g. with a radius of curvature of less than approximately 1 mm (e.g., 1 mm±0.25 mm) or less than approximately 0.5 mm (e.g. 0.5 mm±0.25 mm). In other examples, the step edge 462 may be chamfered, such as chamfered with a cut less than approximately 0.25 mm. Generally, the characteristics of the bowl edge 456, the step edge 462, and annular bowl lip 428 may contribute to the reduction of soot formation, as discussed below.

In one embodiment, the piston bowl 400 has a radius 492 (R1) in the radial direction from the longitudinal center axis 402 to the bowl edge 456. The bowl radius 492 (R1) and bore radius 486 (R) may be sized to reduce soot formation, discussed below. As an example, the bowl radius 492 (R1) may be approximately two-thirds (or 67%) of the cylinder bore radius 486 (R). For example, "approximately 67%" may be considered 67%±10%. As another example, the bowl radius 492 (R1) may be approximately 70% (70%±10%) of the cylinder bore radius 486 (R).

Further, the piston bowl 400 may be considered to have an inner bowl radius 494 (R2) in the radial direction from the longitudinal center axis 402 to the bowl lip 428. The inner bowl radius 494 (R2) and bore radius 486 (R) may be sized to reduce soot formation, discussed below. As an example, the inner bowl radius 494 (R2) is approximately 50% (e.g., 50%±10%) of the cylinder bore radius 486 (R). In particular, the inner bowl radius 494 (R2) is approximately 47% (e.g., 47%±10%) of the cylinder bore radius 486 (R).

In one example, the inner step base surface 442 and the outer step base surface 454 define a soot shelf width 434 (W). Further, the outer step base surface 454 has an outer step width 498 (W1), and the step shoulder surface 452 may have an outer step axial height 496 (H1). The soot shelf width 434 (W), outer step width 498 (W1), outer step axial height 496 (H1), and bowl radius 492 (R1) may be sized to reduce soot formation. For example, the soot shelf width 434 (W) may be approximately 14% of the bowl radius 492 (R1). In this context, "approximately 14%" includes 14%±2%. In a further example, the soot shelf axial height 432 (H) is approximately 14% of the bowl radius 492 (R1). In this context, "approximately 14%" includes 14%±2%. In a further example, the outer step width 498 (W1) may be approximately 50% of the soot shelf width 434 (W). In this context, "approximately 50%" includes 50%±10%.

Accordingly, embodiments discussed above provide a diesel engine piston design that may significantly improve engine performance and engine-out emissions. In particular the arrangement of piston bowls 300, 400 provide a more even mixing of fuel and air prior to combustion. In particular, the relative and dimensions discussed above provide these advantages, including the generally vertical walls (e.g., bowl recess side wall 324, shoulder surface 350, bowl recess side wall 424, step shoulder surface 452, soot shelf shoulder surface 460); the relatively large heights (soot shelf axial height 332 (H), a soot shelf axial height 432 (H), and outer step axial height 496 (H1)); the relatively sharp edges (bowl edge 352 and bowl edge 456); and the other noted and depicted parameters. These bowl parameters may also cooperate with other engine and piston characteristics to improve soot. For example, in one embodiment, the engine and piston characteristics include a diesel engine of 0.8-1.4 L per cylinder displacement with a compression ratio of 15:1-20:1, an intake swirl ratio of 2-3, and injector hole count of 5-7 with a spray angle of 152 (±4)°.

FIGS. 5A-B, 6A-D, 7A-B, and 8A-B depict examples of operational characteristics and/or comparisons of the embodiments discussed above with more conventional bowl designs.

Figure 5A:
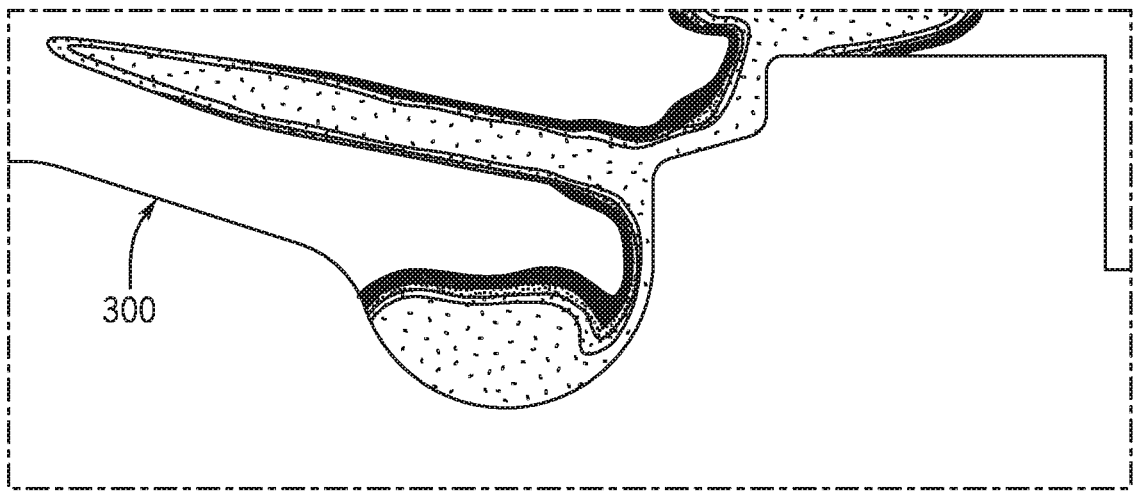
FIGS. 5A and 5B are graphical representations of the mixing of air and fuel during the combustion process within the piston bowl of FIG. 3 according to an example embodiment.
Figure 5B:
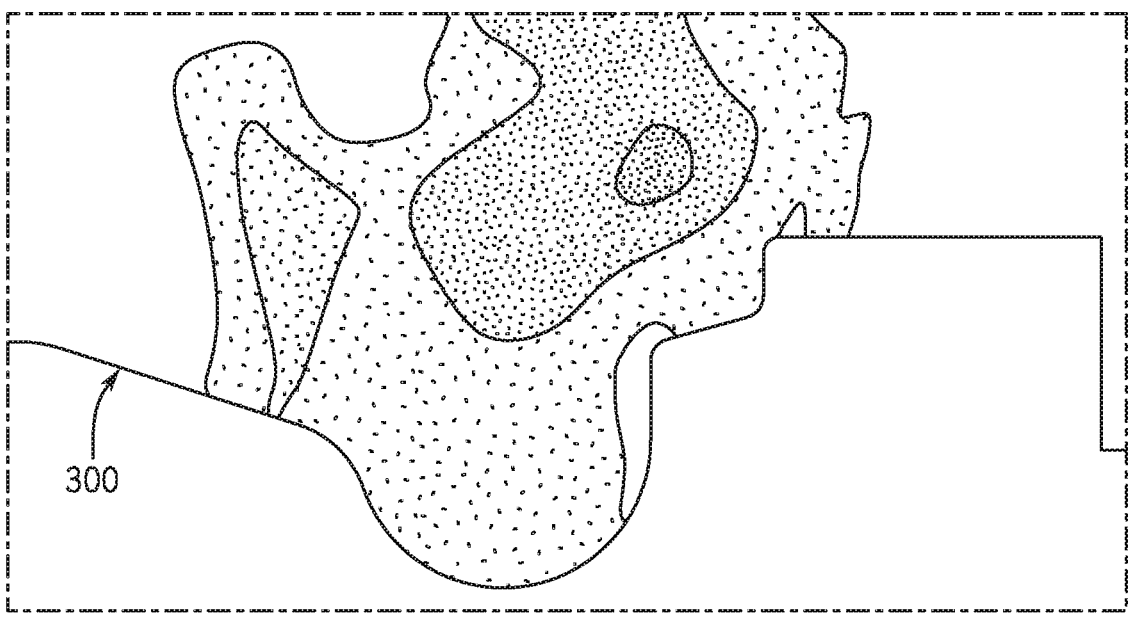

As one example, FIGS. 5A and 5B depict an indication of the development of the mixing of air and fuel during the combustion process at different crank angles in the form of equivalence ratios. In the example of FIGS. 5A and 5B, the spray angle is 150° and the intake swirl ratio is approximately 2.1. The examples of FIGS. 5A and 5B correspond to the bowl 300 of FIGS. 1-3, although the bowl 400 of FIG. 4 provides similar or better results. In particular, FIG. 5A is an equivalence ratio graph within the bowl 300 for the air fuel mixture at a 10° crank angle, and FIG. 5B is an equivalence ratio graph within the bowl 300 for the air fuel mixture at a 30° crank angle. As shown, the shape of the bowl 300 provides more homogeneous distribution of local equivalence (e.g., a more even mixing of the air fuel mixture), which leads to reduced particulate matter emissions and better fuel consumption.

Figure 6A:
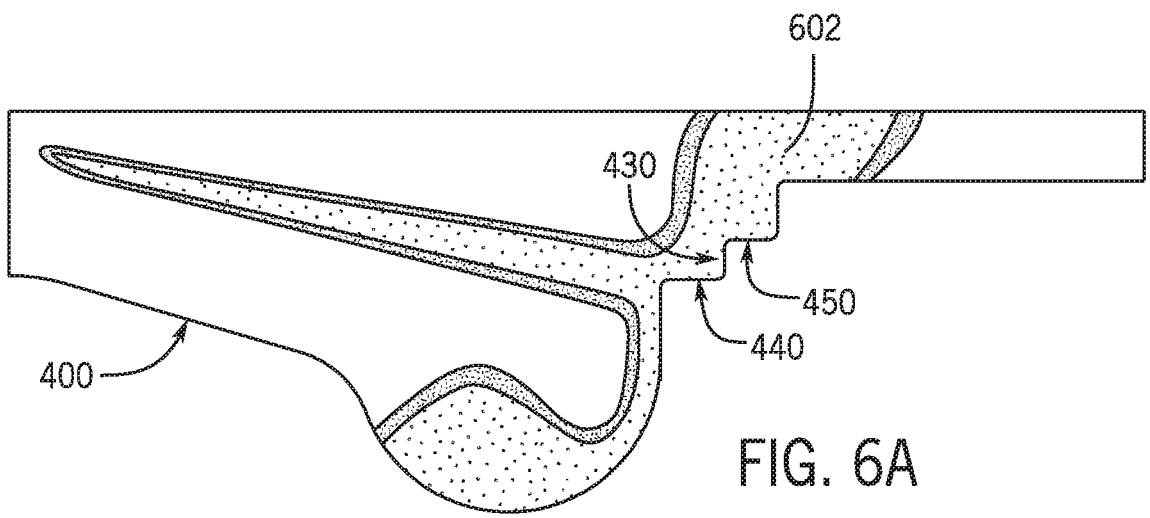
FIGS. 6A and 6B are graphical representations of the mixing of air and fuel during the combustion process within the piston bowl of FIG. 4 according to an example embodiment.
Figure 6B:
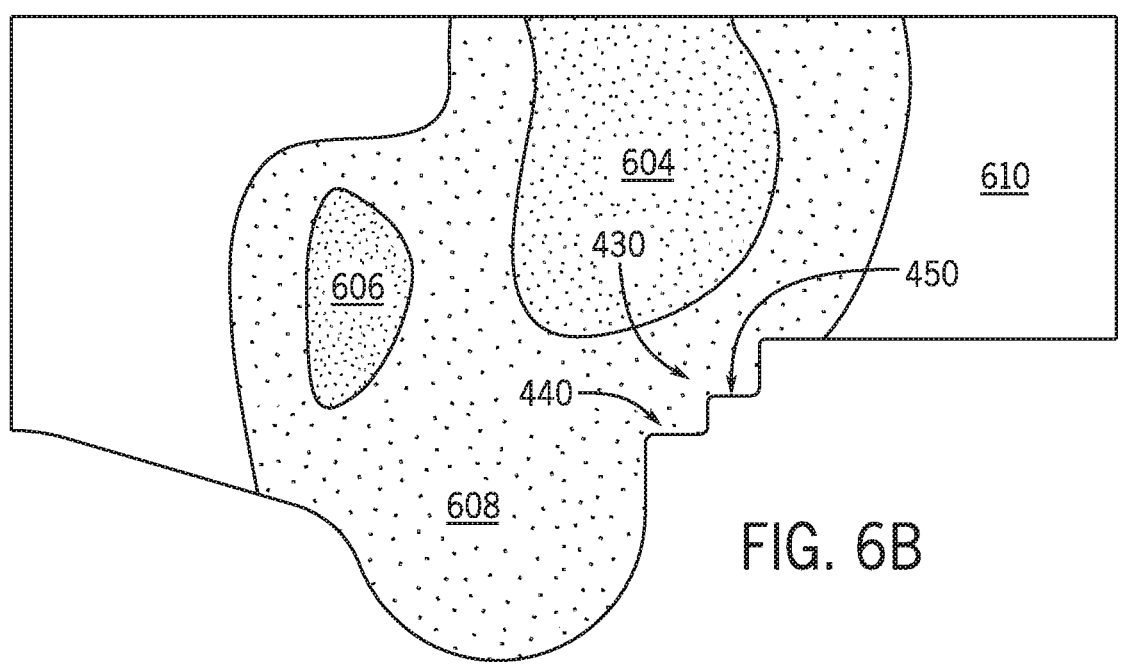

Similar to FIGS. 5A and 5B, FIGS. 6A and 6B provide an indication of the development of the mixing of air and fuel during the combustion process at different crank angles in the form of equivalence ratios, although the examples of FIGS. 6A and 6B correspond to the bowl 400 of FIG. 4. In the example of FIGS. 6A and 6B, the spray angle is 150° and the intake swirl ratio is approximately 2.1.

In particular, FIG. 6A is an equivalence ratio graph within the bowl 400 for the air fuel mixture at a 15° crank angle, and FIG. 6B is an equivalence ratio graph within the bowl 400 for the air fuel mixture at a 40° crank angle. As shown, the shape of the bowl 400 provides more homogeneous distribution of local equivalence (e.g., a more even mixing of the air fuel mixture), which leads to reduced particulate matter emissions and better fuel consumption.

As shown in FIG. 6A, the steps 440, 450 of the soot shelf 430 function to slow down the momentum of spray plume flame and enable a more balanced subsequent motion of flame development (e.g., area 602) to the cylinder liner and to cylinder head. As shown in FIG. 6B, after the end of fuel injection (EOI), the spray plumes further develop into squish volume areas (e.g., 604, 606) with good mixing. Bowl area 608 and near-liner area 610 also show homogeneous mixing. Relatively sharp edges on the steps 440, 450 further prevent heavy soot particles moving toward the cylinder liner, thereby reducing eventual lubrication oil soot and improve engine durability.

Figure 7A:
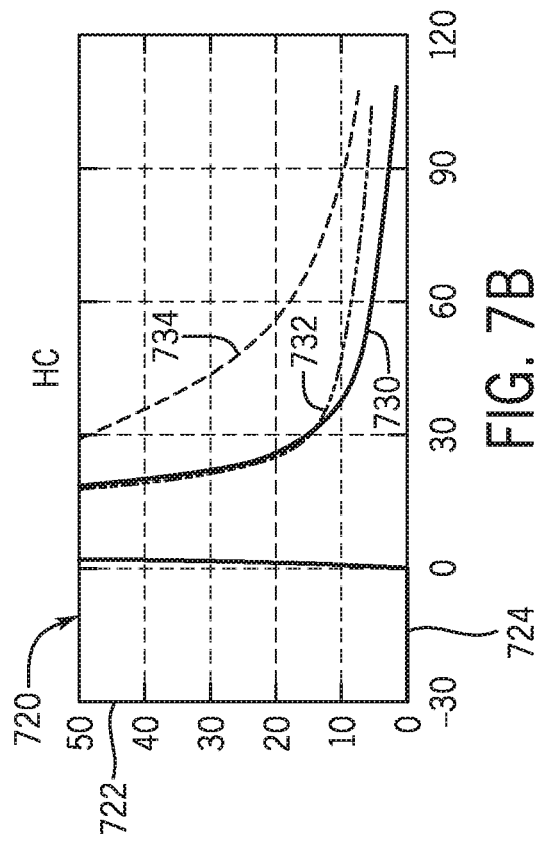
FIGS. 7A-7D are graphical representations of various types of emissions levels associated with the bowls of FIGS. 1-4 according to an example embodiment.
Figure 7B:
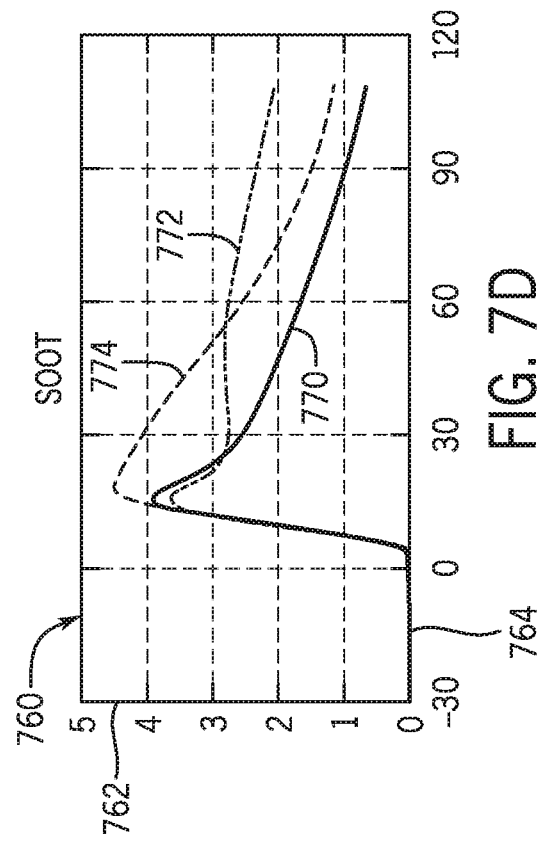
Figure 7C:
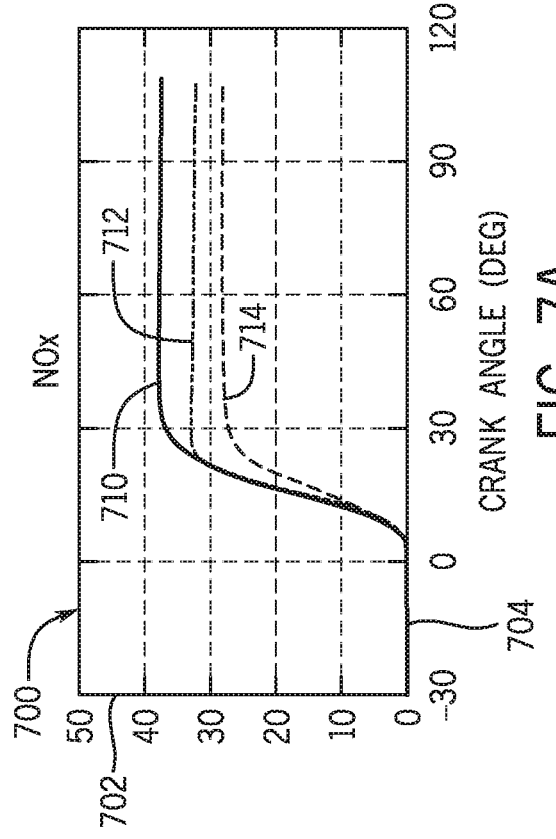
Figure 7D:
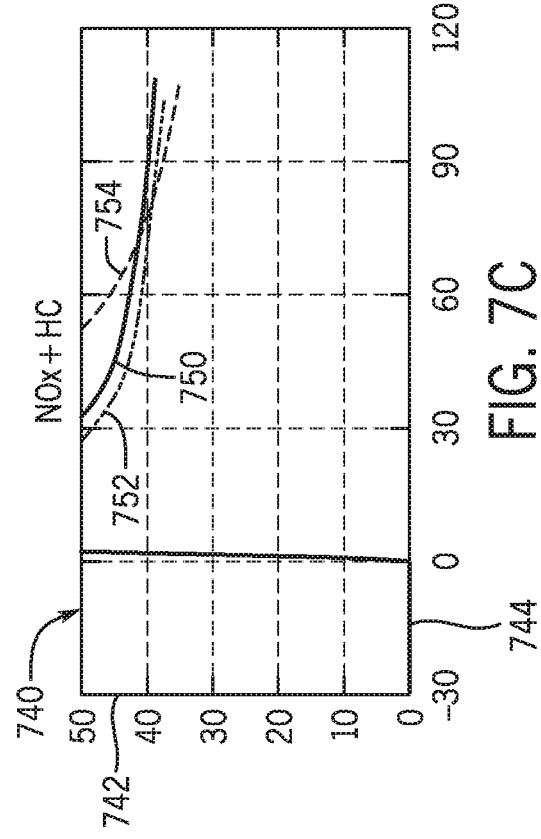

FIGS. 7A-7D provide representations of various types of emissions levels associated with the bowls according to embodiments discussed above (e.g., bowls 300, 400 of FIGS. 1-4) as compared to conventional bowl designs. As examples, FIG. 7A is a graph 700 depicting nitrogen oxides ("NOx") emissions on the vertical axis 702 relative to crank angle on the horizontal axis 704. Line 710 corresponds to the bowls discussed above, and lines 712, 714 correspond to conventional bowl designs. FIG. 7B is a graph 720 depicting hydrocarbon emissions on the vertical axis 722 relative to crank angle on the horizontal axis 724. Line 730 corresponds to the bowls discussed above, and lines 732, 734 correspond to conventional bowl designs. FIG. 7C is a graph 740 depicting the combination of NOx and hydrocarbon emissions on the vertical axis 742 relative to crank angle on the horizontal axis 744. Line 750 corresponds to the bowls discussed above, and lines 752, 754 correspond to conventional bowl designs. FIG. 7D is a graph 760 depicting soot emissions on the vertical axis 762 relative to crank angle on the horizontal axis 764. Line 770 corresponds to the bowls discussed above, and lines 772, 774 correspond to conventional bowl designs. As shown in FIG. 7D, the soot is substantially better for the embodiments discussed above, while as indicated by FIGS. 7A-7C, NOx and hydrocarbon emissions are maintained.

Figure 8A:
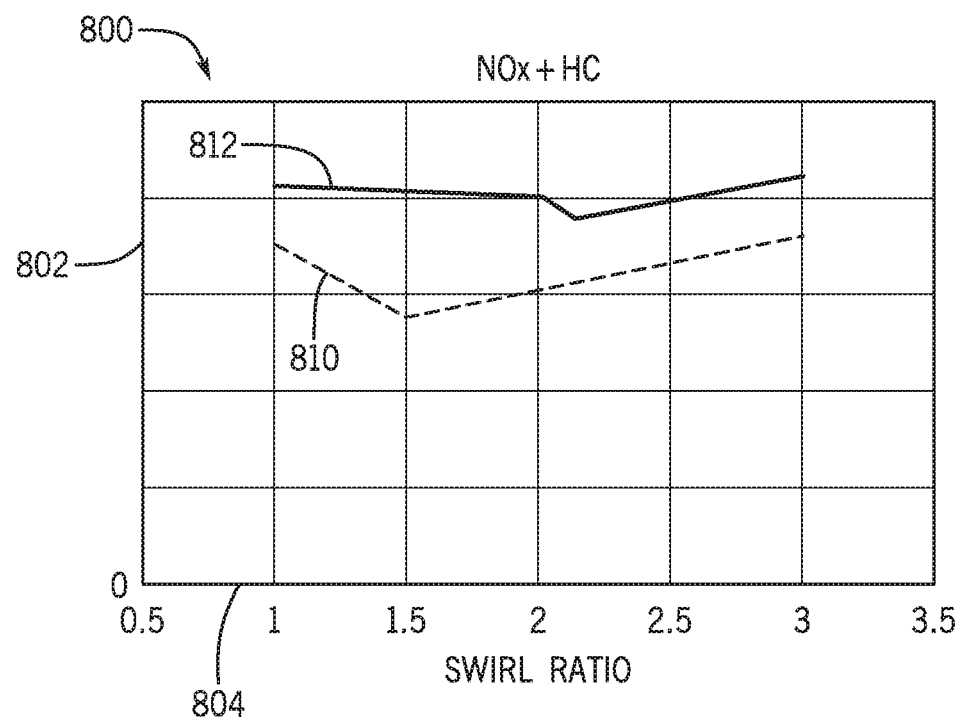
FIGS. 8A and 8B are graphical representations of emissions characteristics for at least the piston bowls of FIGS. 1-3 according to an example embodiment.
Figure 8B:
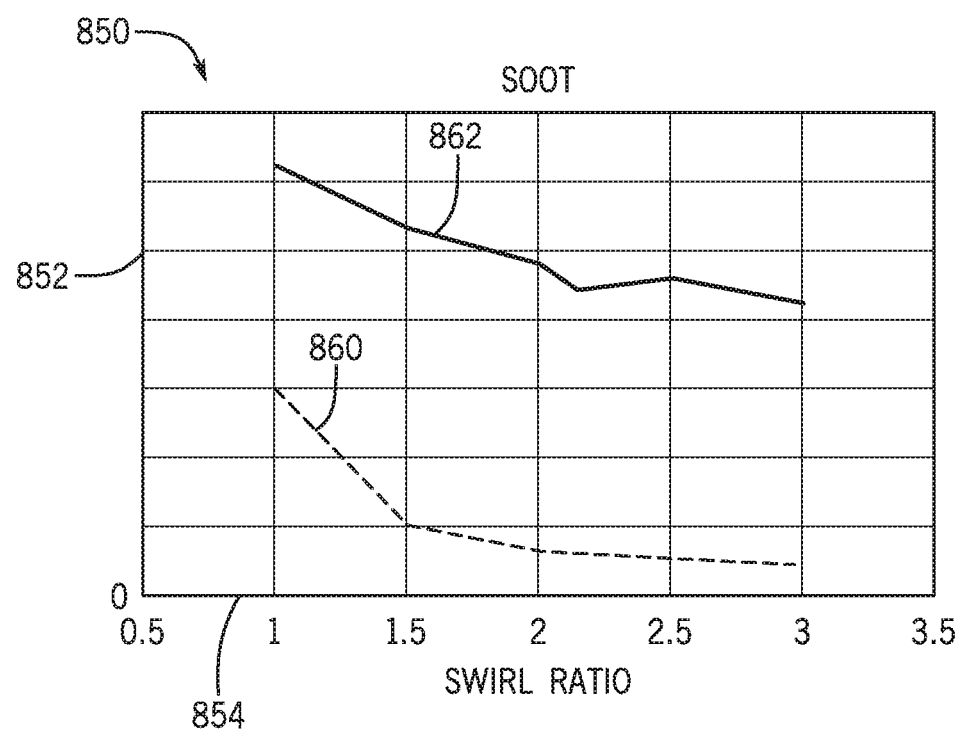

FIGS. 8A and 8B are representations of emission characteristics for the embodiments discussed above in view of swirl ratio and engine speed. In particular, FIG. 8A is a graph 800 depicting the combination of NOx and hydrocarbon levels on the vertical axis 802 and swirl ratio on the horizontal axis 804. In FIG. 8A, line 810 represents the values at 2100 rpms, and line 812 represents the values at 1000 rpms. FIG. 8B is a graph 850 depicting the soot levels on the vertical axis 852 and swirl ratio on the horizontal axis 854. In FIG. 8B, line 860 represents the values at 2100 rpms, and line 862 represents the values at 1000 rpms. As shown by FIGS. 8A and 8B, an engine intake swirl ratio of approximately two (2) or greater provides improved soot emissions while maintaining an acceptable level of hydrocarbon and NOx emissions.

Figure 9:
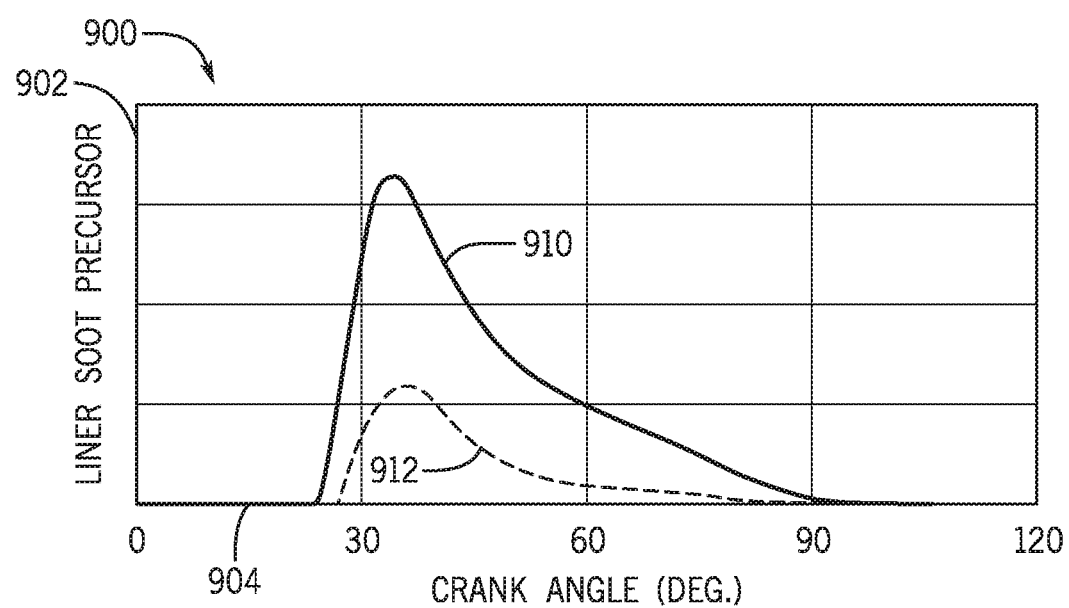
FIG. 9 is a graphical representation of emissions characteristics for the piston bowls of FIGS. 1-4 according to an example embodiment.

FIG. 9 is a representation of emission characteristics for the embodiments discussed above in view of crank angle. In particular, FIG. 9 is a graph 900 depicting the amount of soot precursor mass on cylinder liner (which is highly correlated with soot-in-oil) on the vertical axis 902 and crank angle on the horizontal axis 904. In FIG. 9, line 910 represents the characteristics of the bowl 300 of FIGS. 1-3 at 2100 rpms, and line 912 represents the characteristics of the bowl 400 of FIG. 4 at 2100 rpms. As shown, the bowl 400 of FIG. 4 has a lower peak level, thereby demonstrating improvement with respect to liner soot-in-oil.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A piston for reciprocating within a cylinder bore having a cylinder bore radius (R) in an internal combustion engine, comprising:
   a piston body including an outer cylindrical surface and defined along a longitudinal piston center axis, the piston body having a first axial piston end and a second axial piston end; and
   a piston bowl defined in the first axial piston end and surrounded by an end perimeter surface on the first axial piston end, the piston bowl having a half section profile comprising:
      a bowl entry extending radially from the longitudinal piston center axis;
      a bowl recess extending radially from the bowl entry and defining a bowl depth (D); and
      a soot shelf extending from the bowl recess to the end perimeter surface to define a soot shelf axial height (H) and a soot shelf radial width (W), the soot shelf including:
         an inner step being formed by an inner step base surface extending radially from the bowl recess;
         an outer step being formed by a step shoulder surface extending axially from the inner step base surface and an outer step base surface extending radially from the step shoulder surface; and
         a soot shelf shoulder surface extending axially from the outer step base surface to the end perimeter surface, the soot shelf shoulder surface and the end perimeter surface forming an annular bowl edge;
   wherein the piston bowl has a bowl radius (R1) defined between the longitudinal piston center axis and the annular bowl edge that is approximately 70% of the cylinder bore radius (R);
   wherein the step shoulder surface of the outer step defines an outer step axial height (H1) that is approximately 40% of the soot shelf axial height (H); and
   wherein the bowl depth (D) is approximately 50% of the bowl radius (R1).

2. The piston of claim 1, wherein the step shoulder surface is generally parallel to the longitudinal piston center axis.

3. The piston of claim 1, wherein the soot shelf shoulder surface is generally parallel to the longitudinal piston center axis.

4. The piston of claim 1, wherein the inner step base surface and the outer step base surface define a soot shelf width (W) that is approximately 14% of the bowl radius (R1).

5. The piston of claim 1, wherein the bowl entry and the bowl recess collectively define an inner bowl radius (R2) between the longitudinal piston center axis and the soot shelf, the inner bowl radius (R2) being approximately 50% of the cylinder bore radius (R).

6. The piston of claim 1, wherein the bowl entry defines a bowl floor half angle of approximately 72°.

7. The piston of claim 1, wherein the soot shelf axial height (H) is approximately 14% of the bowl radius (R1).

8. The piston of claim 1, wherein the outer step base surface has an outer step width (W1) that is approximately 50% of the soot shelf width (W).

9. The piston of claim 1, wherein the bowl recess and the soot shelf are joined at an inner bowl lip having a radius of curvature of approximately 1 mm.

10. The piston of claim 1, wherein step shoulder surface and the outer step base surface are joined at a step edge, and wherein the step edge is rounded with a radius of curvature of less than approximately 0.5 mm or chamfered with a chamfer of less than approximately 0.25 mm.

11. The piston of claim 1, wherein the annular bowl edge is rounded with a radius of curvature of less than approximately 0.5 mm or chamfered with a chamfer of less than approximately 0.25 mm.

12. The piston of claim 1, wherein the bowl recess is formed with a curved surface extending from the bowl entry and transitioning into a bowl recess side wall extending to the soot shelf, the bowl recess side wall being generally parallel to the longitudinal piston center axis.

13. The piston of claim 1, wherein the piston bowl is configured to receive a fuel and air mixture with a swirl ratio of greater than approximately 2.

14. The piston of claim 1, wherein the piston bowl is configured to receive fuel of the fuel and air mixture at a spray angle of approximately 152°.

* * * * *